I. M. DAVIDSON.
COMPOSITE CYLINDER AND ROTARY SLEEVE VALVE MOTOR.
APPLICATION FILED OCT. 11, 1915. RENEWED APR. 3, 1919.
1,401,322.
Patented Dec. 27, 1921.
3 SHEETS—SHEET 2.
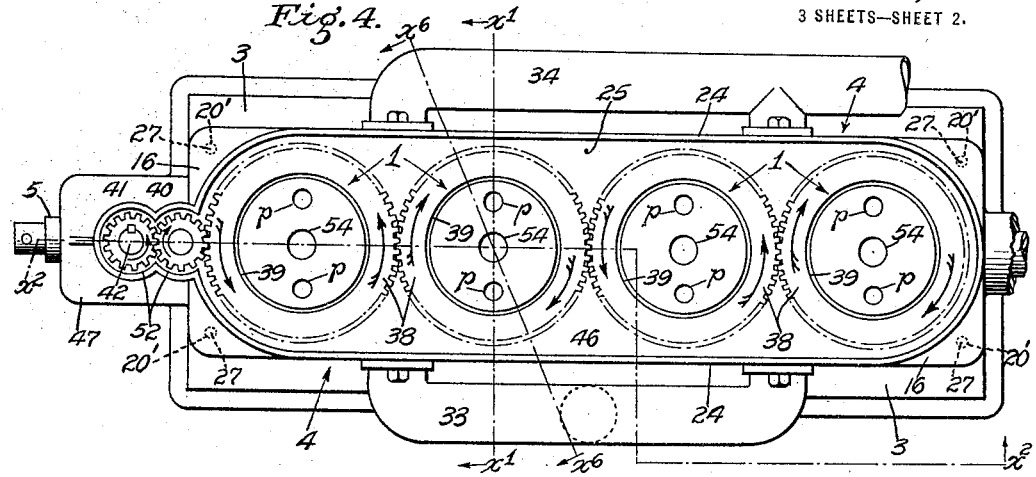
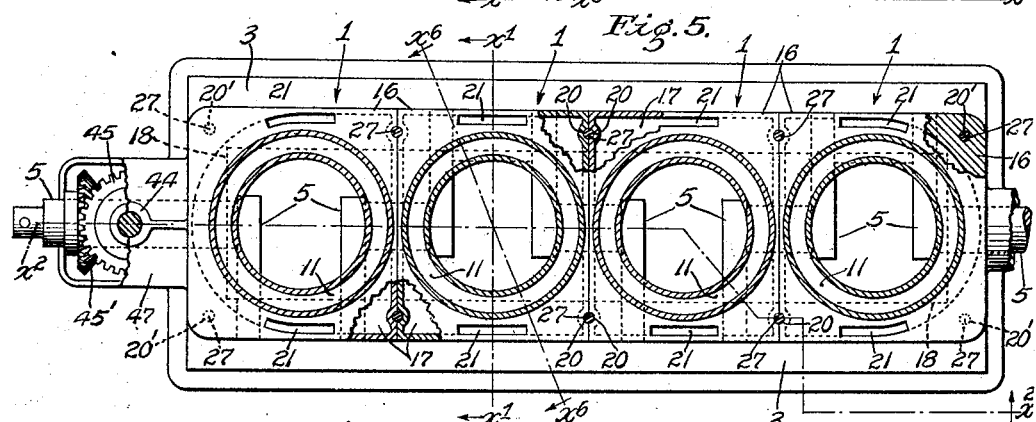
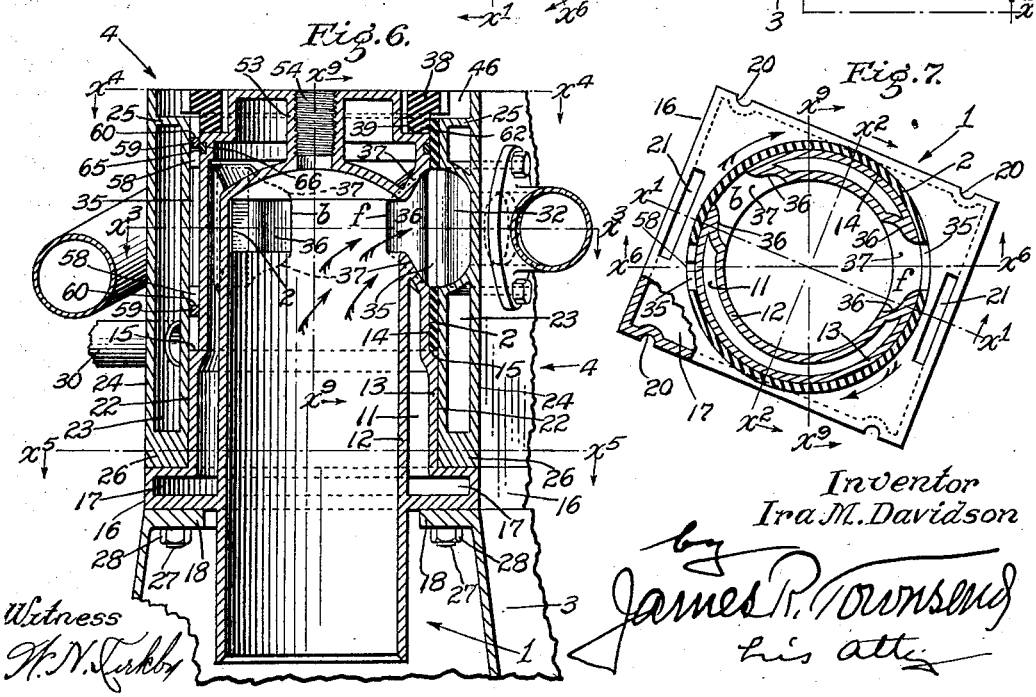
Inventor
Ira M. Davidson
by
James R. Townsend
his atty.
Witness

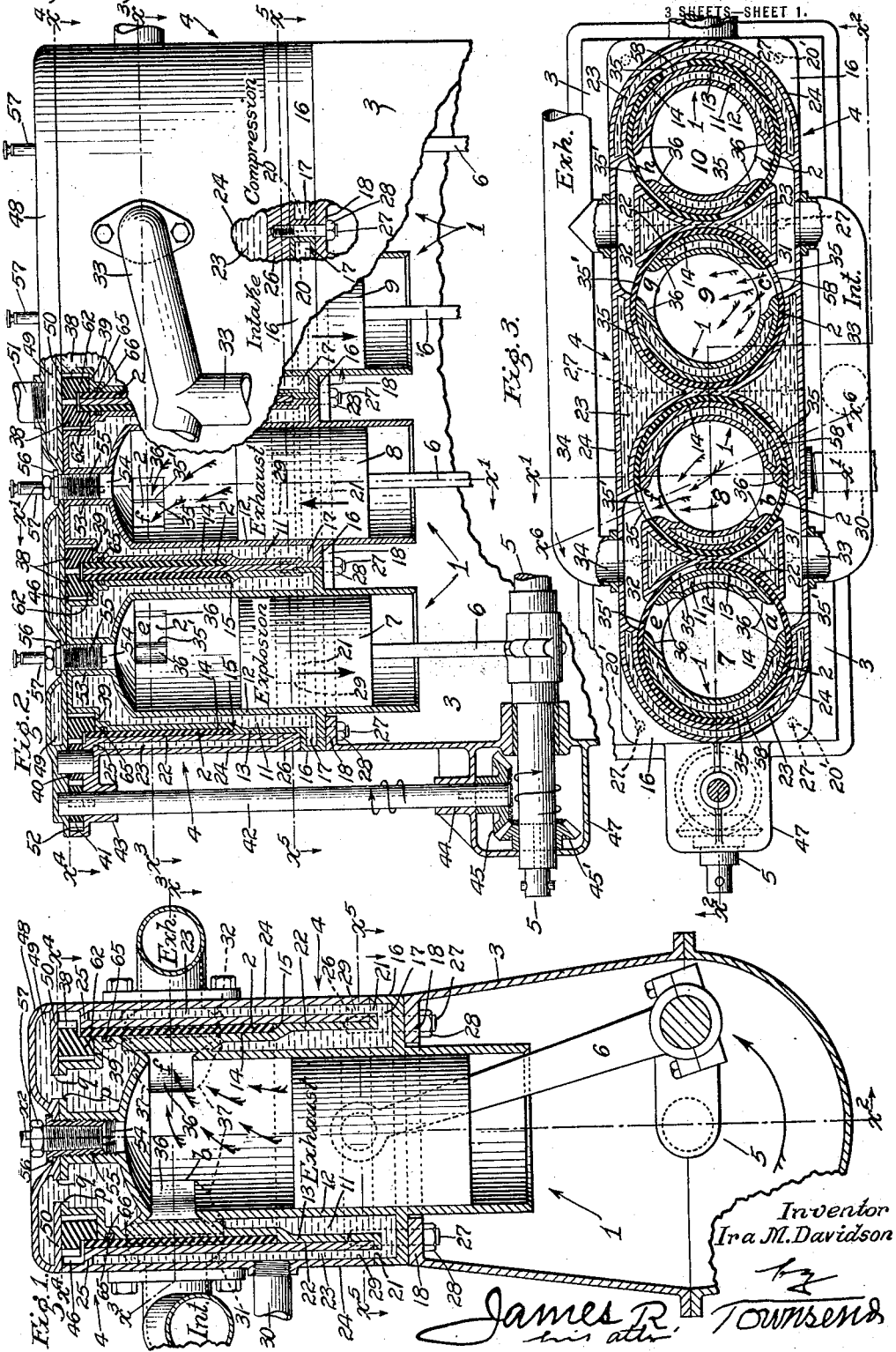

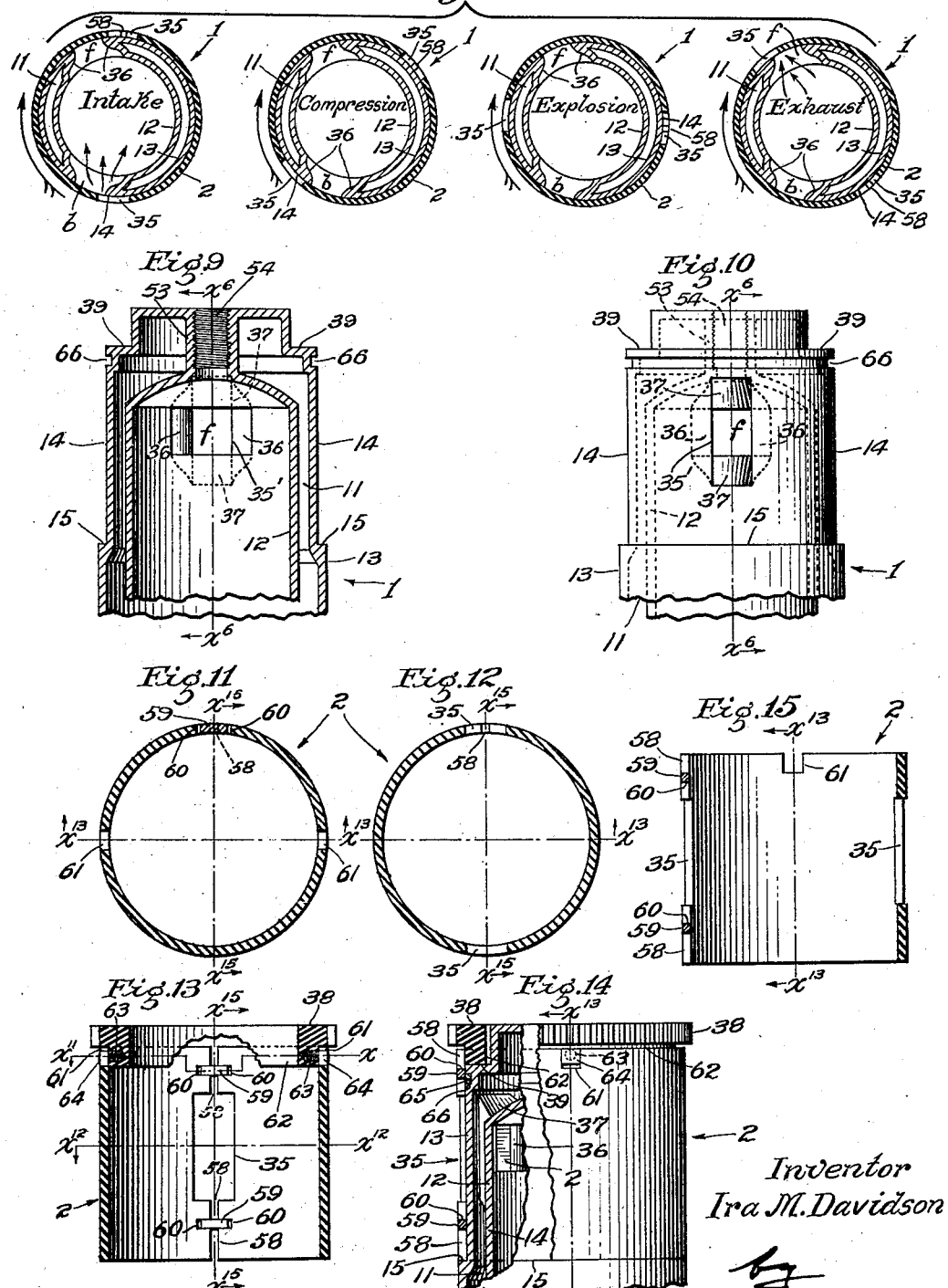

UNITED STATES PATENT OFFICE.

IRA M. DAVIDSON, OF SANTA PAULA, CALIFORNIA, ASSIGNOR OF ONE-THIRD TO RAYMOND I. MOSES, OF LOS ANGELES, CALIFORNIA.

COMPOSITE-CYLINDER AND ROTARY-SLEEVE-VALVE MOTOR.

1,401,322.     Specification of Letters Patent.     Patented Dec. 27, 1921.

Application filed October 11, 1915, Serial No. 55,344. Renewed April 3, 1919. Serial No. 288,599.

*To all whom it may concern:*

Be it known that I, IRA M. DAVIDSON, a citizen of the United States, residing at Santa Paula, in the county of Ventura and State of California, have invented a new and useful Composite-Cylinder and Rotary-Sleeve-Valve Motor, of which the following is a specification.

This invention relates more particularly to that type of multiple cylinder motors employing rotary valves for each of the cylinders.

In this type of motor having annular valve sleeves upon the outside of the cylinders the necessity arises of machining the inside of each cylinder for a piston bore and also machining the outside of each cylinder to form a seat for said valve sleeve which double-machining operation necessitates that the cylinders be made in separate units; and accordingly an object of this invention is to provide a composite cylinder motor comprising a plurality of individual cylinders, each having an outer rotatable valve sleeve, said cylinders with their valves being separately mounted upon the crank case and inclosed by a unit casing.

Another advantage of the composite cylinder arrangement is the ready and quick substitution of one cylinder in case of injury, thereby avoiding the loss of the entire block of cylinders as is the case when cast integral.

A feature of the invention is the mounting of the valve sleeves upon the outside of the water jacketed cylinders and inclosing said valve sleeves and cylinders in a water jacketed casing which arrangement serves to cool the valves both internally and externally as well as to effectively cool the pistons.

An object of the invention is to provide a rotary sleeve valve motor in which the valve sleeves are not exposed to the internal flame of combustion, thereby avoiding warping of the same by excessive heating.

Another object is the provision of a valve sleeve that will compensate for expansion and contraction and also for wear.

A further object of the invention is to provide ready access to the exhaust ports to clean the same of carbon deposits, effected by removal of the exhaust manifold, also to provide ready access to the sleeve driving gears and to the sleeves by removal of the top casing cap.

Another feature of the invention is the comparatively large port opening afforded for the same angle of measurement by mounting the sleeve upon the outside of the cylinder instead of the inside, due to the greater arc of circumferential measurement.

Other objects and advantages will become apparent from the subjoined detail description and the drawings filed herewith, which drawings illustrate a four-cycle, four-cylinder construction, but it is understood that the scope of the invention is not limited to that particular cycle or number of cylinders.

The accompanying drawings illustrate the invention.

Figure 1 is a vertical cross-section through one of the cylinders on line $x^1$, Figs. 2, 3, 4, 5 and 7 illustrating an internal combustion engine constructed in accordance with this invention. The piston is shown on its exhaust stroke.

Fig. 2 is a fragmentary longitudinal view partly in mid-section and viewed from irregular line $x^2$, Figs. 1, 3, 4, 5 and 7.

Fig. 3 is a fragmentary plan section through the intake and exhaust ports on line $x^3$, Figs. 1, 2 and 6. The parts are in position corresponding to that shown in Figs. 1 and 2.

Fig. 4 is a plan view of the motor from line $x^4$, Figs. 1 and 2, the top cap being removed to expose the driving means for the valve sleeves. Curved feathered arrows indicate the direction of rotation.

Fig. 5 is a plan section on line $x^5$, Figs. 1, 2 and 6 omitting the outer motor casing to show the individual cylinders mounted in place upon the crank case. Parts are broken away for clearness of illustration.

Fig. 6 is a fragmental vertical cross-section through the exhaust port on line $x^6$, Figs. 3, 4, 5, 7, 9 and 10, the top cap being removed.

Fig. 7 is a plan section through the intake and exhaust ports of one of the individual cylinders together with its valve sleeve which is in position to open the exhaust port corresponding to Fig. 6. A part of the base flange is broken away and shown in section for clearness of illustration.

Fig. 8 is a diagrammatic view of a cylinder and its valve sleeve showing successive positions of said sleeve during a complete cycle of the engine or two turns of the power shaft.

Curved feathered arrows indicate the direction of rotation of the sleeve.

Fig. 9 is a fragmental cross-section of a cylinder detached on line $x^9$, Figs. 6 and 7, affording an interior view of one of the cylinder ports.

Fig. 10 is a fragmental elevation of a cylinder detached, affording an exterior view of one of the cylinder ports.

Fig. 11 is a cross-section of the valve sleeve viewed from irregular line $x^{11}$, Fig. 13.

Fig. 12 is a cross-section on line $x^{12}$, Fig. 13.

Fig. 13 is an axial section on line $x^{13}$, Figs. 11, 12, 14 and 15, illustrating one of the novel valve sleeves together with its connected driving gear. A portion of the gear is broken away to expose parts otherwise hidden.

Fig. 14 is a fragmental elevation, partly in section similar to Fig. 6 showing a portion of a cylinder together with a sleeve valve and its gear mounted in operative position thereon.

Fig. 15 is an axial section of a valve sleeve detached taken on line $x^{15}$, Figs. 11, 12 and 13.

Arrows on the various section lines indicate the direction of sight.

In the embodiment shown a plurality of individual cylinders 1 are each provided with an outer rotatable valve sleeve 2, said cylinders being separately mounted upon a crank case 3 and inclosed by an outer casing 4 that is suitably secured to the crank case over the cylinders to hold the same in assembled position.

The crank shaft 5, pitmen 6, pistons 7, 8, 9, 10 and crank case 3 are all of the usual or any preferred construction.

The cylinders are cast in separate units and each is preferably provided with a water jacket 11 formed between the annular wall 12 of the combustion chamber and an outer cylinder wall 13. An annular seat 14 in said outer wall 13 extends down for a considerable distance from the top of the cylinder and terminates in a supporting shoulder 15 which seat serves to mount one of the annular sleeves 2 that slips over its cylinder and down upon said shoulder 15 to thus surround the cylinder, said jacket 11 serving to cool the sleeve internally as well as the combustion chamber.

Integral with the cylinder walls 12 and 13 at the lower portion of each cylinder is a rectangular base flange 16 having a water jacket chamber 17 that is in communication with the cylinder jacket 11. The flanges 16 of the several cylinders seat upon an encircling flange 18 of the crank case, abutting one against another when the cylinders are positioned in place thereon and the upright abutting edge walls of the flanges 16 are provided with semi-circular recesses 20, see Figs. 5 and 7, which are brought into corresponding register to form circular holes when the cylinders are assembled. Side openings 21 in the top of each flange 16 afford communication to the water jacket 11 through the jacket chamber 17.

The outer casing 4 is cast *en bloc* and is provided with a plurality of cylindrical bores 22 corresponding to the number of individual cylinders making up the motor, there being a bore for each cylinder. An encircling water jacket 23 is provided between the walls of the adjacent bores 22 and an outer wall 24 of the casing, said water jacket being inclosed by a top wall 25 and a floor 26 which floor is made sufficiently thick to receive studs 27 that are suitably spaced therearound and depend from said floor.

After positioning the separate cylinders in place on the crank case flange 18 the casing 4 is lowered down over the cylinders until the floor 26 rests upon the abutting cylinder flanges 16, the casing bores 22 slipping over the cylinders and their respective seats 14 to thus form valve chambers for the sleeves 2. The casing studs 27 extend down through the intermediate circular holes formed by the registering flange recesses 20, also through the end flange holes 20′, and pass through the flange 18 to receive nuts 28 that screw against the under side of said flange to thus securely mount the casing in place over the several individual cylinders and hold the same in true alinement over the crank case.

It is noted by this individual cylinder construction that upon unscrewing the nuts 28 and removing the outer casing the cylinders may be separately dismantled when desired and readily replaced as in case of injury.

Side openings 29 (see Fig. 1) in the floor 26 of the casing are positioned to register with the openings 21 of the various flange jackets when the casing is seated over the cylinders. It is evident that the water circulates from the casing jacket 23, to which it is admitted by the inlet 30, down through the various registering openings 29, 21, to the respective cylinder jackets 11 the valve sleeves being cooled externally by the casing jacket 23 and internally by the respective cylinder jackets 11.

The cylinders are provided at their upper ends with intake ports $a$, $b$, $c$, $d$, respectively, and with exhaust ports $e$, $f$, $g$, $h$, respectively, all of said ports being of similar construction, extending radially across the water jacket 11 and opening outwardly into the annular seat 14. The motor is shown as constructed with four cylinders arranged in sets of two, but it is understood that the scope of the invention is not limited to this particular number. The arrangement of the assembled cylinders is such that the ports of each set lie in converging pairs, each pair of intake ports converging toward one side of the motor and each pair of exhaust ports converging toward the other side of the motor.

Intake passages 31 for each converging pair of intake ports are formed in the outer casing at one side of the motor and are adapted to communicate with the respective pairs of intake ports $a$, $b$ and $c$, $d$ while exhaust passages 32 for each converging pair of exhaust ports are formed in said casing at the other side of the motor and are adapted to communicate with the respective pairs of exhaust ports $e$, $f$ and $g$, $h$.

The usual intake and exhaust manifolds 33, 34 are respectively connected with the intake passages 31 on one side and the exhaust passages 32 on the other side of the motor.

Each valve sleeve turns in its annular chamber between the respective seat 14 and casing bore 22 and is provided with diametrically opposite ports 35 that are adapted to appropriately open and close the respective intake and exhaust ports to effect induction and exhaust of the operating fluid for the several cylinders. The precise arrangement and size of the motor and sleeve ports will vary according to different forms and sizes of motor construction.

The ports 35 of each valve sleeve open in turn the respective intake and exhaust ports and from Fig. 8 it will be seen that the sleeve in the present instance makes one half a turn during a complete cycle of the motor or two turns of the crank shaft 5, thus timing the sleeve to turn at one-fourth the speed of the crank shaft.

The seat openings 35' of the intake and exhaust ports will be preferably about the same width as the sleeve ports 35, however this width will vary according to the circumference of the valve sleeve as well as the amount of lag desired in closing the intake port upon the intake stroke of the piston and the amount of lead in opening the exhaust port upon the exhaust stroke of the piston.

For convenience of illustration the present timing arrangement is shown conventional in form, the respective intake ports closing at the bottom of the piston stroke and the exhaust ports closing at the top of the piston stroke.

As the width of the various ports is limited as above described, sufficient port area is provided by making the outer port or seat opening 35' of a greater depth than width, while on the other hand the width of the inner port opening is made of a greater width than depth to secure an efficient working stroke of the piston.

The foregoing arrangement combines to produce a port that is reversely funnel-shaped on horizontal and vertical planes respectively, being bounded by tapering walls 36 that are inwardly expanding on a horizontal plane and tapering walls 37 that are outwardly expanding on a vertical plane. The sleeve ports 35 are each of greater depth than width to correspond with the elongated seat opening 35' of the intake and exhaust ports.

It is noted that the valve sleeves turn in opposite directions to correspond with the converging port arrangement of the cylinder sets. This is accomplished by gears 38 that are preferably positioned on annular shoulders 39 of the respective cylinder tops and are detachably fastened to the respective sleeves, said gears in the instance shown meshing one with another and being driven at the requisite speed by any suitable connection to the crank shaft as an idle pinion 40 and a driven pinion 41 secured to an upright shaft 42 that is mounted in top and bottom bearings 43, 44 respectively at the front of the motor, said shaft 42 being driven from the crank shaft by miter gears 45 and 45' inclosed in the gear case 47.

The outer casing 4 is open at its top, the bores 22 communicating with a top chamber 46 formed above the top jacket wall 25 of the casing to accommodate the meshing gears 38 and over this chamber and the open tops of the various cylinders is suitably mounted a cap 48 having a water jacket 49 that is in communication with the various cylinder jackets 11 by means of port holes $p$ (see Figs. 1 and 4) in the outer top walls of each of the cylinders, said holes registering with corresponding port holes $q$ in the floor 50 of the jacket 49.

It is thus seen that by removing the cap 48, ready access is afforded to the sleeve driving gears and also to the sleeves for purposes of inspection as well as to permit of a ready and convenient replacing of the gears or sleeves in case of need.

It is noted that the cooling water is supplied to each cylinder individually, circulating from the outer water jacket 23 down through the various openings 29, 21 and up through each cylinder jacket 11, thence passing through the various port holes $p$, $q$ into the top jacket 49 from where it is withdrawn by the outlet pipe 51 that is suitably positioned in the cap. By this jacketed arrangement it is seen that a uniform cooling action is maintained as each cylinder always has a bulk of water in the outer jacket 23 from which to draw.

The casing and cap are extended at the front of the motor to form a chamber 52 for the pinions 40 and 41 of the driving connection to the valve sleeves.

Upper necks 53 between the top inner and outer walls of the respective cylinders form sockets 54 into which are screwed hollow bushings 55, each having a head 56 that engages the cap to hold the same securely in place over the cylinders and chamber 46 when said bushings are screwed into the sockets.

The cylinders are provided with ignition means such as the well-known spark plugs 57 which in the instance shown are screwed into the respective hollow bushings 55 and project through so as to bring their inner ends adjacent the combustion chamber, said spark plugs being electrified by suitable means, not shown, such as a battery or magneto, the construction and operation of which are well known in the art.

The pressure of a cylinder explosion exerted through the respective intake and exhaust ports against the inclosing sleeve acts to thrust the sleeve against the internal bore 22 of the casing which tends to bind and offer resistance to the turning of said sleeve. To compensate for this thrust said valve sleeve is loosely attached to its driving gear 38 and is slitted at one side thereof which allows the sleeve to contract slightly and draw away from the bore wall 22 as the sleeve is turned to thus relieve this binding action.

Said sleeve is preferably slitted through one of the ports 35, the dividing slit or gap 58 extending from the upper and lower edges of the port to the ends of the sleeve. Circumferential packing strips 59 are mounted in transverse recesses 60 arranged at top and bottom intermediate the port and sleeve end, said strips bridging the gap 58 to prevent leakage therethrough and at the same time permitting the slit edges to be automatically squeezed together or spread apart to respectively contract or expand the sleeve and thereby avoid binding the sleeve in its respective seats.

Each sleeve is normally expanded against its bore 22 to thereby form a gas-tight seal.

The sleeves are each provided with sockets 61 cut into the tops of said sleeves at diametrically opposite sides thereof, said sockets being spaced equi-distant from the slit 58. The gears 38 are each provided with a hub 62 having diametrically opposite studs 63 with heads 64 which are adapted to extend into the sockets 61 as the hub is inserted into the open top of said sleeve. As will be seen from Figs. 2 and 14 the gear hub 62 in the open top of the sleeve is seated upon the annular shoulder 39 while the sleeve is seated upon the seat shoulder 15 and a slight clearance is thereby provided between the lower face of the gear teeth and the top of the sleeve which clearance is just sufficient to compensate for the longitudinal expansion of the sleeve.

The head and socket connection 64, 61 serves to non-rotatably connect the sleeve and its driving gear, at the same time allowing circumferential and longitudinal expansion of the sleeve; while the equi-distant spacing of the sockets 61 relative to the slit 58 produces the most effective action in squeezing together the slit edges to contract the sleeve when resistance to the turning of the same is encountered as by the explosion thrust.

An expansion ring 65 is mounted in the annular external groove 66 in the top of each cylinder just below the shoulder 39 thereof, which ring bears against the inside of the sleeve and serves to prevent any leakage through to the gear chamber 46.

As the width of a sleeve port 35 varies in proportion to the distance from the center of the cylinder for a certain angle of measurement, the sleeve may be made of sufficient radius to give the desired width of port opening and the outside of the cylinder made of a corresponding radius to receive said sleeve, irrespective of the internal cylinder bore.

Accordingly, by mounting the sleeve upon the outside of the cylinder, the constructor is enabled to increase the size of valve opening for a cylinder of definite bore by correspondingly increasing the diameter of the outer seat 14 together with its sleeve.

In practice considering the motor as running with the parts in the position shown in the drawings and referring particularly to Figs. 1, 2, 3 and 6, the piston 7 is being operated on the power stroke by explosion in its corresponding cylinder, the intake and exhaust ports $a$, $e$ being closed by the sleeve valve 2.

The power thus applied to the piston 7 drives the piston 10 on its compression stroke to compress a charge previously sucked into the corresponding cylinder, the intake and exhaust ports $d$, $h$ being closed by the sleeve; and drives the piston 9 on its intake stroke to suck a charge into the corresponding cylinder through the registering intake ports $c$, 35 from the intake manifold 33, the exhaust port $g$ being closed by the sleeve; and drives the piston 8 on its exhaust stroke to exhaust the fired gases from the corresponding cylinder through the registering exhaust ports $f$, 35 to the exhaust manifold 34 and thence to the atmosphere, the intake port $b$ being closed by the sleeve.

Referring to Fig. 3 it is seen that piston 9 is sucking in a charge through its intake port $c$ and that piston 8 is the next in order to suck in a charge through its intake port $b$, and that then the piston 7 will suck in a charge through its intake port $a$, and that then the piston 10 will suck in a charge through its intake port $d$.

The arrangement of the cylinders and valves is such as will operate the four pistons shown in the order 7—10—9—8 or as commonly expressed the cylinders, if a four cycle engine, will be fired in the order one, four, three, two, counting numerically from the front of the engine which is the left hand end in Figs. 2 and 3 of the drawings.

The arrangement may be otherwise than that shown to produce a different order of firing of the different cylinders than that just described.

By my novel rotary valve construction, it is seen that I have devised a valve sleeve to normally expand against its bore and thus automatically take up for the sleeve wear as it occurs, and it is also noted that the sleeve compensates for both circumferential and longitudinal expansion caused by the combustion heat of the motor.

I claim:—

1. The combination with a motor crankcase of a plurality of individual cylinders each having an intake and an exhaust port, rotary valve sleeves surrounding the respective cylinders and adapted to appropriately open and close the respective intake and exhaust ports, said cylinders being provided with base flanges adapted to seat upon the crank case, an outer casing inclosing the cylinders and their sleeves and seating upon said flanges, studs depending from said outer casing and extending down through the flanges, said studs being secured to the crankcase to thereby mount the casing in place over the cylinders and maintain the same in true alinement over the crank case.

2. In a motor, the combination with a cylinder having an intake and an exhaust port, of an annular seat upon the outside of said cylinder, an outer casing provided with a cylindrical bore adapted to inclose said cylinder and seat to form an annular valve chamber, a valve sleeve to turn in said chamber to appropriately open and close said intake and exhaust port, said sleeve being provided with opposite ports one of which has slits extending from said port to the ends of the sleeve and thereby permitting the same to contract and expand in said chamber, packing strips to bridge said slits and prevent leakage therethrough, and means to turn the sleeves.

3. In a motor, the combination with a cylinder having an intake and an exhaust port, of an annular seat upon the outside of said cylinder, an outer casing provided with a cylindrical bore adapted to inclose said cylinder and seat to form an annular valve chamber, a slitted valve sleeve to turn in said chamber to appropriately open and close said intake and exhaust port, an annular shoulder at the top of the cylinder, a gear mounted on said shoulder and adapted to turn the sleeve, means to connect said sleeve and gear to permit of expansion and contraction of the sleeve in said chamber, and means to actuate the gear.

4. In a motor, the combination with a cylinder having an intake and an exhaust port, of an annular seat upon the outside of said cylinder, an outer casing provided with a cylindrical bore adapted to inclose said cylinder and seat to form an annular valve chamber, a slitted valve sleeve to turn in said chamber to appropriately open and close said intake and exhaust port, an annular shoulder at the top of the cylinder, a gear mounted on said shoulder and adapted to turn the sleeve, studs upon opposite sides of said gear, the sleeves being provided with sockets adapted to receive said studs to connect the sleeve and gear and thereby permit circumferential and longitudinal expansion and contraction of the sleeve in said chamber, and means to actuate the gear.

5. In a motor, a cylinder having lateral intake and exhaust ports and a water jacket, said cylinder having an opening in its bottom to afford communication to said jacket, a rotary valve sleeve upon the outside of said cylinder and surrounding said water jacket, said sleeve being adapted to appropriately open and close the intake and exhaust ports; and a casing mounted over said cylinder and sleeve, said casing being provided with a surrounding water jacket and having an opening in its bottom to afford communication from said jacket, said cylinder opening being adapted to register with said casing opening to permit of circulation from the casing to the cylinder.

In testimony whereof, I have hereunto set my hand at Los Angeles, California, this 30th day of September, 1915.

IRA M. DAVIDSON.

Witnesses:
JAMES R. TOWNSEND,
WILLIAM N. KIRKBY.